United States Patent [19]

Van Gerwen et al.

[11] 4,317,212

[45] Feb. 23, 1982

[54] ARRANGEMENT FOR CHECKING THE SYNCHRONIZATION OF A RECEIVER

[75] Inventors: Petrus J. Van Gerwen; Wilfred A. M. Snijders, both of Eindhoven, Netherlands

[73] Assignee: U.S. Philips Corporation, New York, N.Y.

[21] Appl. No.: 134,035

[22] Filed: Mar. 26, 1980

[30] Foreign Application Priority Data

Apr. 20, 1979 [NL] Netherlands ................... 7903100

[51] Int. Cl.³ ............................................. H04L 7/06
[52] U.S. Cl. .................................... 375/113; 375/20; 375/108; 340/347 SH
[58] Field of Search ............... 364/825, 826, 829, 830, 364/572, 605; 371/47, 56, 71, 72; 333/19, 173; 370/100, 105, 106; 375/108, 50, 109, 113, 117; 340/347 SH

[56] References Cited

U.S. PATENT DOCUMENTS

| 3,403,377 | 9/1968 | Connolly | 371/47 |
| 3,846,583 | 11/1974 | Boulter | 375/50 |
| 4,092,725 | 5/1978 | Hershman | 364/825 |
| 4,149,260 | 4/1979 | Loper | 364/830 |

Primary Examiner—Benedict V. Safourek
Assistant Examiner—Stephen Chin
Attorney, Agent, or Firm—Thomas A. Briody; William J. Streeter; Edward W. Goodman

[57] ABSTRACT

Arrangement for checking the synchronization of a data signal receiver. When frequency division is used as part of the clock signal regeneration process, a phase ambiguity may occur. To eliminate this ambiguity use is made of a monitoring device. In the present monitoring circuit the data signal is sampled twice in each symbol interval and a reliable criterion is obtained by integration of the amplitude differences of the samples.

1 Claim, 6 Drawing Figures

ARRANGEMENT FOR CHECKING THE SYNCHRONIZATION OF A RECEIVER

A. BACKGROUND OF THE INVENTION

A(1) Field of the invention.

The invention relates to an arrangement for checking the synchronization of a receiver for data signals having a spectrum comprising two sidebands located one on each side of a symbol frequency.

Arrangements of the above type are called monitoring devices. Synchronizing the receiver is usually effected by a clock signal device which derives a synchronous clock signal from the data signal on the basis of clock information present in the data signal itself. By means of a non-linear processing of the received data signal, a strong signal component having a frequency of twice the symbol frequency can be obtained. The clock signal which is required for signal regeneration, must be derived from this signal component by means of frequency division, which causes an ambiguity in the phase of the clock signal. A monitoring device serves to determine the correct phase of the clock signal.

A(2) Description of the prior Art.

In a known monitoring circuit for bi-phase modulation (Manchester code) in accordance with U.S. Pat. No. 3,403,377 the monitoring criterion is derived from the transitions in the received data signal. This criterion is sensitive to signal distortion due to the transmission path.

B. SUMMARY OF THE INVENTION

It is an object of the invention to provide a monitoring device which depends to a lesser extent on the transmission path.

The monitoring device according to the invention is characterized in that the received data signal is sampled in each symbol interval at two synchronous instants which are half a symbol interval apart and that the samples which are taken at the first and the second instant, respectively, are applied with opposite polarity to an integrator, a check signal being derived from the output of this integrator.

The monitoring device is particularly suitable for data signals which are encoded in accordance with a so-called "crankshaft" code (FIG. 1) and which have been filtered in the receiver in an optimum manner.

C. SHORT DESCRIPTION OF THE FIGURES

D. DESCRIPTION OF THE PREFERRED EMBODIMENT

Figure 1:
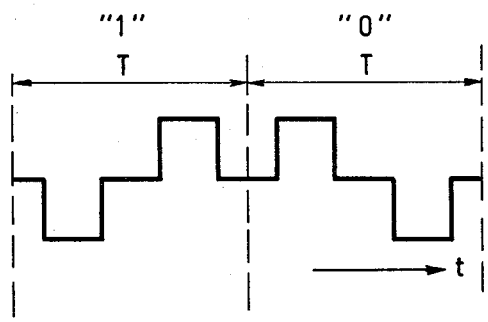
FIG. 1 shows data signal waveforms associated with the "crankshaft" code.
Figure 2:
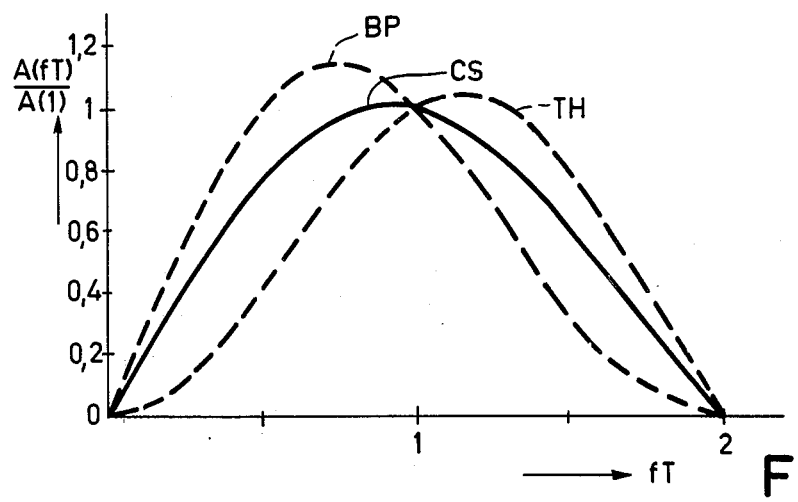
FIG. 2 shows some amplitude-versus-frequency spectra of different coding (modulation) methods.

In FIG. 1, the signal waveforms for the data symbols "1" and "0" in a symbol interval of T seconds, are shown, these data symbols being encoded in accordance with the "crankshaft" code which is so called because of the shape of the waveform. The amplitude-versus-frequency spectrum of the "crankshaft" code is represented in FIG. 2 by curve CS. The amplitude spectrum for ordinary bi-phase modulation is represented in FIG. 2 by curve BP. The curve TH in FIG. 2 illustrates the amplitude spectrum for a so-called "top hat" code which is another form of bi-phase modulation in accordance with the U.S. Pat. No. 3,846,583.

The "crankshaft" code, bi-phase modulation and the "top hat" code have in common that the coded or modulated signal is a double sideband signal having the symbol frequency 1/T Hz as the carrier frequency. The following description relates to the "crankshaft" code. Adaptations necessary for the other codes will be mentioned at the end of the description.

Figure 3:
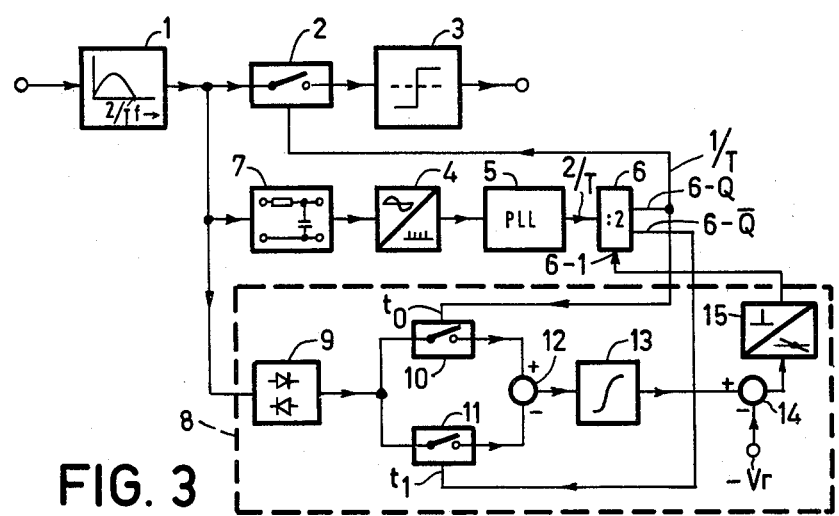
FIG. 3 is a block diagram of a receiver provided with a monitoring device according to the invention.

As shown in FIG. 3, an optimum receiver for the "crankshaft" code comprises a receive filter 1, a sampling switch 2 and a polarity detector 3. The optimum receive filter is a lowpass filter having a cut-off frequency which is twice the bit-frequency 2/T Hz. Between 0 Hz and 2/T Hz the filter characteristic has a sinusoidal variation as defined by the expression:

$$j \sin(\omega t/4) \qquad (1)$$

An approximation of the spectrum of the "crankshaft" code is also given by expression (1). The result is that at the output of receive filter 1 the spectrum is approximately defined by the expression:

$$\sin^2(\omega t/4) \qquad (2)$$

Signals having a spectrum as defined by expression (2) have an eye pattern which is illustrated in FIG. 4a. The sampling switch 2 would have to sample the received data signal at the sampling instants $t_o \pm nT$ for optimum reception.

The clock signal channel of the receiver comprises in a conventional manner a zero-crossing detector 4, a phase-locked loop (PLL) 5 and a divide-by-two frequency divider 6. An integrator 7 is arranged between the output of the receive filter 1 and the zero-crossing detector 4, which effects that zero crossings occurring at the input of detector 4 are a multiple of T/2 seconds apart. Disturbing zero-crossings at a distance of T/4 seconds to the desired zero crossings are eliminated by integrator 7. In FIG. 4a the desired zero crossings are denoted by a, b, c and d and the disturbing zero-crossings by e and f.

A strong signal component having a frequency equal to twice the symbol frequency 2/T Hz is produced at the output of zero-crossing detector 4. This component is selected by the phase-locked loop 5. Frequency divider 6 divides the frequency by two to obtain the symbol frequency 1/T Hz.

Figure 4:
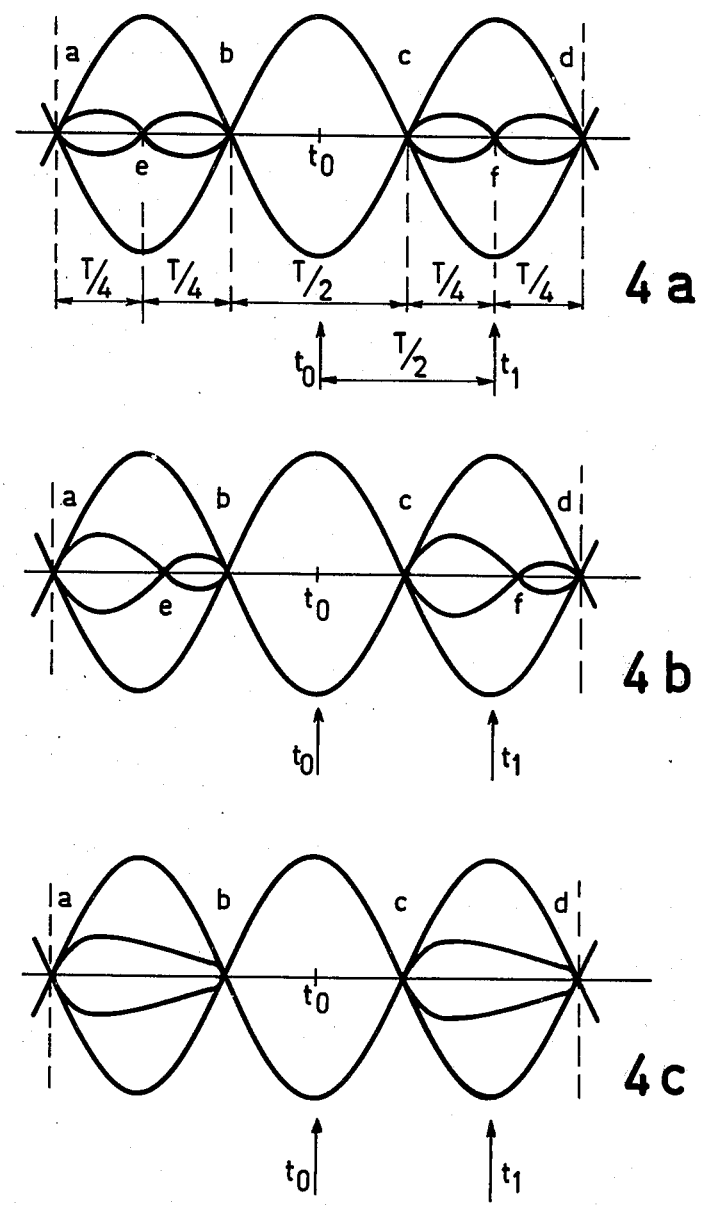
FIG. 4 (comprising FIGS. 4a–4c) shows some eye patterns.

Frequency divider 6 has two outputs 6-Q and 6-$\overline{Q}$. The sampling pulses which must occur at the instants $t_o \pm nT$ (FIG. 4a) are derived from output 6-Q. The pulses which occur at output 6-$\overline{Q}$ are located half way between the pulses occuring at output 6-Q. The instants determined by these pulses are indicated by $t_1 \pm nT$ (FIG. 4). The instant $t_1$ differs by T/2 seconds from the instant $t_o$. FIG. 4a shows the proper location of the instant $t_o$ and $t_1$ with respect to the eye pattern. If frequency divider 6 has not been adjusted to the proper phase, the data signal is sampled by sampling switch 2 in that portion of the eye pattern where the disturbing zero-crossings e and f are situated. This results in falsification of the regenerated data.

Frequency divider 6 includes a control input 6-1 for adjusting this divider to the proper phase. A phase monitoring circuit 8, which is connected to the output of receive filter 1, is connected to control input 6-1.

Phase monitoring circuit 8 comprises a full-wave rectifier 9 to which two sampling switches 10 and 11, which are controlled by outputs 6-Q, and 6-$\overline{Q}$, respectively, at the sampling instants $t_o \pm nT$ and $t_1 \pm nT$, respectively are connected. The respective signal samples of sampling switches 10 and 11 are applied with a positive and a negative polarity, respectively, to an integrator 13 by way of a difference producer 12. Thus the integrator is charged in each symbol interval by the amplitude difference of the signal samples of the data signal at the instants $t_o$ and $t_1$.

The monitoring criterion makes use of the fact that in the portion of the eye pattern in which the disturbing zero-crossings e, f are located the signal amplitude at the sampling instants may have a low value, depending on the data (FIG. 4a). The disturbing zero crossings e, f may change their position when a cable is present between the transmitter and the receiver, as shown in FIG. 4b and c, which illustrate the eye pattern at an increasing cable length. However, at the sampling instants in this portion of the eye pattern amplitudes having a low value still continue to occur, depending on the data.

With a proper location of the instants $t_o$ and $t_1$ the integrator 13 is charged in the positive sense; when the instants are incorrectly situated integrator 13 is charged negatively. Should, in the case of negative charging of the integrator 13 the output voltage of the integrator 13 decrease below a predetermined reference voltage $-V_r$, then the output voltage of difference producer 14 passes through zero. This transition from a positive output voltage to a negative output voltage is detected by zero-crossing detector 15, which in response thereto applies a control pulse to frequency divider 6 in order to adjust it to the proper phase.

The eye pattern of the "top hat" code has also a portion in which, depending on the data, signal amplitudes having a low value may occur. Thus the described monitoring circuit can also be directly used for the "top hat" code. The difference in the receiver shown in FIG. 3 will be in the shape of the filter characteristic of receive filter 1. When the "top hat" code is used, the receive filter 1 might have a uniform filter characteristic up to the cut-off frequency of 2/T Hz.

In practice it appeared that an ordinary bi-phase modulated signal, which is passed through a differentiator, has an eye pattern, which is comparable to the eye pattern at the output of receive filter 1 when the "crankshaft" code is used. For use with ordinary bi-phase modulation, monitoring circuit 8 must then be preceded by a differentiator. Also, in this case, receive filter 1 might have a uniform filter characteristic.

What is claimed is:

1. An arrangement for checking the synchronization of a receiver for data signals having a spectrum comprising two sidebands located on each side of a symbol frequency, characterized in that said arrangement comprises means for sampling the amplitude of the data signal at two synchronous instants during each symbol interval, said synchronous instants being separated by a half a symbol interval, an integrator, means for applying said sample data, taken at each of said synchronous instants, with opposite polarity, respectively, to said integrator, and means for deriving a check signal from said integrator output indicative of the synchronization of said receiver.

* * * * *